United States Patent
Ohishi

Patent Number: 5,733,178
Date of Patent: Mar. 31, 1998

[54] METHOD OF TEXTURING A SUBSTRATE USING A STRUCTURED ABRASIVE ARTICLE

[75] Inventor: Michihiro Ohishi, Sagamihara, Japan

[73] Assignee: Minnesota Mining and Manfacturing Co., St. Paul, Minn.

[21] Appl. No.: 733,217

[22] Filed: Oct. 17, 1996

Related U.S. Application Data

[63] Continuation of Ser. No. 398,198, Mar. 2, 1995, abandoned.

[51] Int. Cl.$^6$ ............... B24B 1/00; B24B 7/19; B24B 7/30
[52] U.S. Cl. ............... 451/41; 451/42; 451/56; 451/59; 451/527; 451/533; 451/539
[58] Field of Search ............... 451/41, 42, 527, 451/528, 533, 539

[56] References Cited

U.S. PATENT DOCUMENTS

| | | | |
|---|---|---|---|
| 2,237,846 | 4/1941 | Schenk | 91/3 |
| 4,735,632 | 4/1988 | Oxman et al. | 51/295 |
| 4,762,534 | 8/1988 | Ito et al. | 51/293 |
| 4,773,920 | 9/1988 | Chasman et al. | 51/295 |
| 4,974,373 | 12/1990 | Kawashima et al. | 51/295 |
| 5,061,294 | 10/1991 | Harmer et al. | 51/295 |
| 5,107,626 | 4/1992 | Mucci | 51/281 |
| 5,129,462 | 7/1992 | Bruxvoort et al. | 51/293 |
| 5,137,542 | 8/1992 | Buchanan et al. | 51/295 |
| 5,152,917 | 10/1992 | Pieper et al. | 51/295 |
| 5,199,227 | 4/1993 | Ohishi | 51/395 |
| 5,203,884 | 4/1993 | Buchanan et al. | 51/295 |
| 5,307,593 | 5/1994 | Lucker et al. | 51/281 |
| 5,391,210 | 2/1995 | Bilkadi et al. | 51/298 |
| 5,437,754 | 8/1995 | Calhoun | 156/231 |
| 5,489,235 | 2/1996 | Gagliardi et al. | 451/527 |
| 5,527,368 | 6/1996 | Supkis et al. | 51/298 |

FOREIGN PATENT DOCUMENTS

| | | | |
|---|---|---|---|
| 0 554 668 | 8/1993 | European Pat. Off. | B24D 11/00 |
| 0554668 | 8/1993 | European Pat. Off. | |
| 0 642 889 | 3/1995 | European Pat. Off. | B24D 11/00 |
| 0647950 | 4/1995 | European Pat. Off. | B24D 11/00 |
| 2-8312 | 3/1990 | Japan . | |
| 2-83172 | 3/1990 | Japan | B24D 11/00 |
| 4-159084 | 6/1992 | Japan | B24D 1/00 |
| 5-228845 | 9/1993 | Japan | B24D 11/00 |
| 453851 | 9/1936 | United Kingdom . | |
| WO94/15752 | 7/1994 | WIPO | B24D 11/00 |
| WO94/27780 | 12/1994 | WIPO | B24B 1/04 |
| WO95/07797 | 3/1995 | WIPO | B24D 11/00 |

OTHER PUBLICATIONS

"MIPOX" New Product Announcement Brochure of Mipox International Corp., Hayward, CA; 32 pp, published prior to Mar. 2, 1995.

Primary Examiner—Robert A. Rose
Assistant Examiner—George Nguyen
Attorney, Agent, or Firm—Gary L. Griswold; Walter N. Kirn; Paul W. Busse

[57] ABSTRACT

A method for texturing magnetic recording media substrates using a structured abrasive article including a flexible backing having a major surface and an abrasive coating, the abrasive coating attached to and at least substantially covering the entire total surface area of the major surface, where the abrasive coating includes a plurality of precisely-shaped three-dimensional abrasive composites, and the composites comprise a plurality of abrasive particles dispersed in a binder, which binder provides the means of attachment of the composites to the backing.

21 Claims, 3 Drawing Sheets

METHOD OF TEXTURING A SUBSTRATE USING A STRUCTURED ABRASIVE ARTICLE

This is a continuation of application Ser. No. 08/398,198 filed Mar. 2, 1995 abandoned.

BACKGROUND OF THE INVENTION

1. Field of the Invention

The present invention relates to a method of texturing a rigid substrate of a magnetic recording medium before application of a magnetic coating thereto with a structured abrasive article having three dimensional abrasive composites disposed on a flexible backing.

2. Discussion of the Related Art

Personal computers have become commonplace in the modern workplace. Many personal computers contain a rigid memory disk or hard drive. A hard drive involves a rigid thin film metal-coated disk or nonmetal disk as the substrate of the magnetic medium. In one conventional arrangement, the thin film rigid disks are manufactured by electroless nickel plating a thin-film of nickel or nickel alloy onto an aluminum base, such as nickel/phosphorus (Ni—P). The Ni—P coating is then polished to a very fine, mirror-like finish. After polishing, the Ni—P coating is textured, followed by the application of a magnetic coating(s) thereon to form the magnetic medium. However, nonmetal substrates, such as glass or ceramic substrates, also are used in the rigid memory disk industry in place of the metal substrates. For these nonmetallic substrates, there is no metal or metal alloy coating applied onto the substrate before subsequent polishing, texturing and magnetic coating application. Rather, the surface of the glass or ceramic rigid disk itself is polished, textured, and thereafter the magnetic coating is directly applied thereon without interposing any metal or metal alloy coating layer.

The texturing portion of this process is critical to the performance of the rigid disks. The texturing process preferably results in a random pattern of uniform scratches with sharply defined edges in a substantially circumferential direction relative to the center of the rigid disk.

Texturing accomplishes a number of purposes. It improves the aerodynamics between the computer head (which reads and writes data on the disk) and the thin film rigid disk as the disk spins beneath the head. It also improves the magnetic properties of the coated disks. The scratches formed during texturing make it easier for the head to distinguish bytes of information between tracks on the disk. If the scratches are too deep, however, there may be a potential loss of data on the rigid disk. The texturing also eases the separation between the computer head and the rigid disk when the computer is first turned on. When the computer is turned on and energized, the rigid disk will begin to spin. If the disk is smooth and untextured, this head/disk contact makes it difficult for the disk to start spinning. This is known in the computer industry as stiction/friction.

The texturing process is traditionally accomplished by using a loose abrasive slurry. The loose abrasive slurries provide substantially circumferential scratches that have sharply defined edges having the requisite depth. Loose abrasive slurries are, however, accompanied by a number of disadvantages. For instance, the loose abrasive slurries create a large amount of debris and waste. As a result, the thin film rigid disks must be thoroughly cleaned to remove any residues left on their surface from the abrasive slurry. The loose abrasive slurry also results in a relatively high amount of wear on the equipment used for texturing.

To overcome the disadvantages associated with loose abrasive slurries, coated abrasive lapping tapes have been used to texture the thin film rigid disks. An example of such a product is "IMPERIAL" Lapping film (Type R3) commercially available from 3M Company, St. Paul, Minn. This lapping film comprises a polymeric film backing having an abrasive coating layer bonded thereto. The abrasive coating layer consists of very fine abrasive particles (average particle size less than 10 micrometers) dispersed in a binder and coated on the polymeric film to form a thin layer (about 10–15 micrometers). The surface profile of the abrasive coating is essentially flat other than the partial protrusions formed of some of the fine abrasive particles. During use, the lapping film abrades a portion of the substrate surface, thereby texturing the surface of the substrate. Similarly, U.S. Pat. No. 4,974,373 to Kawashima et al. describes an abrasive tool suited for use in lapping, polishing, texturing, and various other finishes of precision machine parts, mentioning hard disks, magnetic heads, ceramics, plastics, and jewels involving abrasive powder particles fixed in a separated proximity to each other in a binder resin coat as a continuous monolayer disposed on a plastic film base to form the abrasive tool.

Japanese laid-open application no. 5-228845 of Tokyo Magnetic Printing Co. Ltd, published on Sep. 7, 1993, discloses a texturing polishing film for magnetic disk substrates, where the polishing film involves abrasive particles retained on a plastic film or nonwoven fabric tape with a water soluble resin, preferably as a single particle layer.

The portion of the substrate abraded away during texturing is known in the industry as swarf. Practice has shown that swarf generated during the use of such lapping films having sealed backings and nonstructured abrasive coatings is still apt to be present at the interface of the abrasive coating and the substrate work surfaces. Therefore, there remains some opportunity for the swarf to become attached to the high spots on the textured rigid substrate where lapping films are employed. That particular phenomenon is known in the industry as reweld. Those high spots are highly undesirable as they can collide with the computer head during use, which can cause a loss of data and/or head damage as a result of the collision.

In addition to the problems with reweld, the lapping film may not provide scratches having edges as sharp and/or clean as those produced by the loose abrasive slurries. These lower quality scratch edges may degrade the quality of the disks manufactured using lapping film for the texturing process.

As a recent alternate proposal to lapping films, the use of porous nonwoven cloths coated on a surface with an abrasive slurry has been advanced as another method to uniformly texture thin film metal or metal alloy coated rigid disks before application of the magnetic coatings in a clean process that generates high quality scratches and avoids the problem of reweld. For example, U.S. Pat. No. 5,307,593 (Lucker et al.) discloses a nonwoven substrate coated with an abrasive slurry that is used in a method for texturing magnetic media substrates having a thin-film metal or metal alloy coating, where the porous nonwoven substrate provides advantages such as the ability to collect and entrap the swarf and debris away from the work interface during the abrasion procedure, among other things.

The use of structured abrasive articles has been described recently where abrasive composites are formed on flexible backings in the form of rows of aligned individual abrasive composites or as elongate ridges of abrasive material. For instance, U.S. Pat. No. 5,152,917 (Pieper et al.) discloses structured abrasive articles with abrasive composites that are precise three-dimensional shapes extending from the backing. Recesses or channels are left between the abrasive composite shapes to facilitate the discharge of swarf from the abrasive article and thereby reduce loading. Pieper et al. do not disclose the use of their abrasive article for texturing rigid disks.

Also, U.S. Pat. No. 5,107,626 (Mucci) describes a method for treating a workpiece by a structured abrasive article to produce a precise pattern on the workpiece surface, where the workpiece is described as any solid material. The examples of solid materials given by Mucci include metal and metal alloys, such as carbon steel, stainless steel, high nickel alloys and titanium, as well as other disparate surfaces such as plastic, painted surfaces, ceramics, wood, marble, stone and the like. Mucci, like Pieper et al., do not disclose the use of their abrasive article for texturing rigid disks.

Additionally, U.S. Pat. No. 5,219,462 (Bruxvoort et al.) describes an abrasive article having discrete expanded abrasive composites positioned at and formed in recesses formed in the surface of a backing. The abrasive composites, as grown out of the recesses, are spaced-apart across exposed regions of the front surface of the backing. The technique described in Bruxvoort et al. requires the added investment of time and expense in forming the recesses in the backing to receive the abrasive slurry, and also in the precautions and special care needed to limit coating of the abrasive slurry only into the recesses. The Bruxvoort et al. patent discloses a rigid disc texturing test.

SUMMARY OF THE INVENTION

The present invention relates to a method of texturing a rigid substrate of a magnetic recording medium before application of a magnetic coating thereto with a structured abrasive article having an abrasive coating disposed upon and covering at least substantially an entire major surface of a flexible backing, wherein the abrasive coating includes three-dimensional abrasive composites. The method of the present invention enables a rigid substrate of a magnetic recording medium to be textured before application of the magnetic coating(s) in a clean process that generates high quality scratches.

In one embodiment of the present invention, the present invention relates to a method of texturing a rigid substrate of a magnetic recording medium before application of a magnetic coating to the substrate, the method comprising the steps of:

a) providing a rigid substrate;

b) providing an abrasive article in frictional contact with the substrate, the abrasive article comprising a flexible backing having a major surface with a total surface area and an abrasive coating, the abrasive coating attached to and at least substantially covering the total surface area of the major surface, wherein the abrasive coating includes a plurality of precisely-shaped three-dimensional abrasive composites, the composites comprising a plurality of abrasive particles dispersed in a binder, which binder provides the means of attachment of the composites to the backing; and c) abrading the substrate with the abrasive article to form scratches in the substrate.

The rigid substrate employed in the present invention can be a metal or nonmetal material. The metal variety of substrate includes a composite including a metal base, such as aluminum, coated with a thin-film of metal or metal alloy, such as a Ni—P layer. The nonmetal variety of substrate includes a monolithic layer made of a nonmetal material, such as a glass or ceramic material.

In one further embodiment, the method is performed with an abrasive article where the aforesaid abrasive composites are ridges comprising abrasive particles and binder, where the ridges each traverse the surface of the abrasive article from one edge of the abrasive article to the opposite edge thereof without interruption along any one ridge and each ridge forms a separate distinct line of contact with a disk surface. The ridges can be oriented either perpendicular or at a nonperpendicular angle to the machine direction and side edges of the abrasive article. This pattern provides uniform contact, good aggressivity and high scratch density without burr formation on the textured surface.

In another further embodiment, the method is performed with an abrasive article where the abrasive composites are ridges where each ridge is formed of intermittent individual abrasive composites aligned in a row, where the ridges traverse the surface of the abrasive article from edge to the opposite edge thereof. Here again, the ridges can be oriented either perpendicular or at a nonperpendicular angle to the machine direction and side edges of the abrasive article.

DETAILED DESCRIPTION OF THE PREFERRED EMBODIMENTS

The present invention provides a method of texturing rigid substrates such as used for magnetic media disks, e.g., computer disks, before the application of the magnetic coatings in a clean process. The present invention generates high quality scratches and avoids the problem of reweld associated with the conventional lapping films.

The typical process of texturing a magnetic medium disk substrate using the method of the present invention involves providing a rigid substrate that generally has a thickness between 0.75 to 1.25 millimeter. The substrates can be made from rigid metal or nonmetal materials. The metal materials preferably involve a metal or metal alloy coating applied onto a metal base, where the metal base is preferably an aluminum alloy. The nonmetal materials preferably are glass or ceramic. As can be understood, the "rigid substrate" of the invention means a generally circular disc constituted by a single distinct layer or plural distinct superposed layers formed into an integral article, which is susceptible to application and adherence of a magnetic layer thereon.

Figure 1:
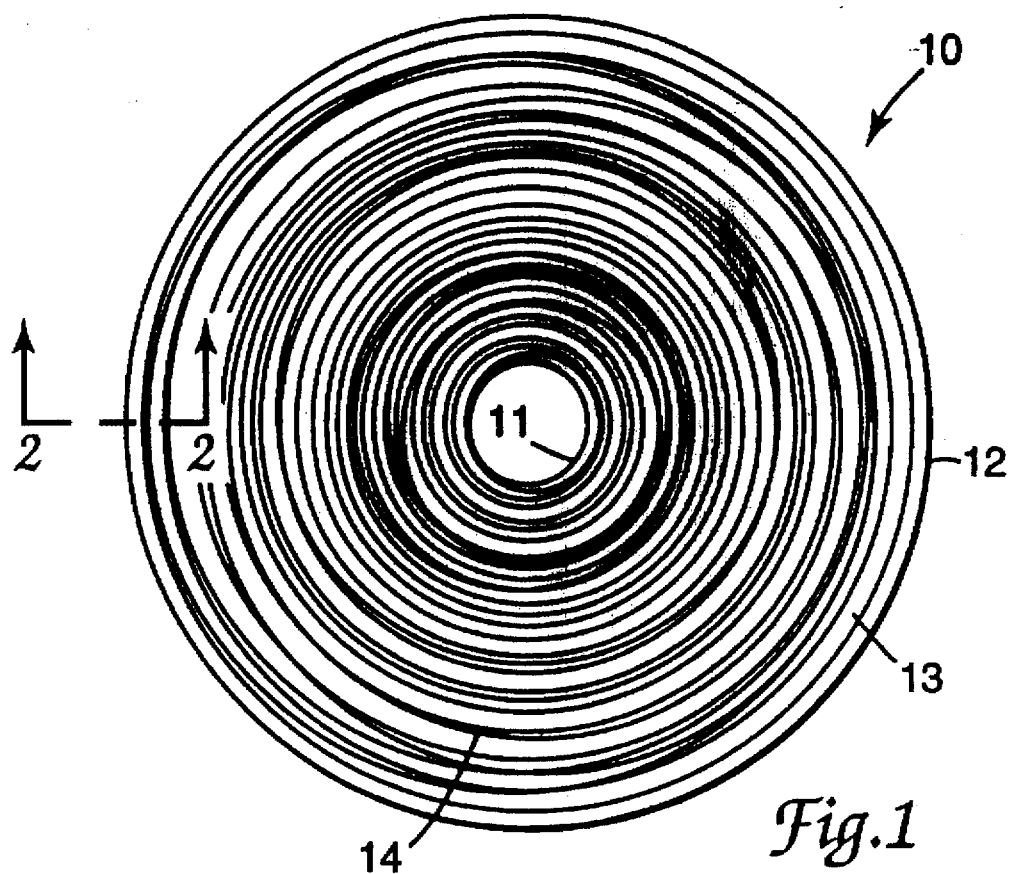
FIG. 1 is a top view of a thin-film metal coated rigid disk substrate textured according to the method of the present invention.

Referring to the rigid substrate for a memory disc as illustrated in FIG. 1, the rigid substrate disk 10 is generally circular in shape with center hole 11. A metal or metal alloy coating 13 is applied over at least one surface 12 of a disc-shaped metal base 25 (shown in FIG. 2). The metal coating is typically applied to both opposite major surfaces of the rigid substrate disk 10.

For the purposes of the present invention, the coating will be occasionally referred to merely as "metal", but the term will be understood to include metal or metal alloys. The metal is typically applied by electroless nickel plating, although other coating techniques may be employed. The metal coating thickness is generally between 5 to 20 micrometers, and more typically about 15 micrometers.

The preferred nickel coating includes phosphorus to prevent the nickel from having magnetic properties.

The preferred coating typically contains from about 5 to 20% phosphorus, usually about 12% phosphorus.

After coating, the rigid disk substrate surface 12 is polished to a very fine finish, usually by a conventional loose abrasive slurry. Loose abrasive slurries comprise a plurality of abrasive particles (typically having an average particle size less than 5 micrometers) dispersed in a liquid medium, such as water or an organic solvent. After polishing with the loose abrasive slurry, the metal coating has a very fine random scratch pattern or orientation.

The arithmetic average of all distances from the centerline of the roughness profile of the surface of the polished metal coating preferably has a value of less than 20 angstroms, more typically less than 17A. That surface finish value is referred to herein as Ra, and is also known as Center Line Average. As referred to in connection with the present invention, Ra is measured using a Wyko TOPO-3D Interferometer (purchased from Wyko Corp., Tucson, Ariz.) with a 40× objective lens. It will be understood that other methods of measuring Ra could be used in connection with the method of the present invention, with appropriate adjustments to the preferred values of Ra as discussed herein.

After polishing, the metal coating on surface 12 is ready to be textured according to the method of the present invention. Texturing of the metal coating on the surface 12 results in a random pattern of scratches 14 in a substantially circumferential direction relative to the center of the rigid disk substrate 10. The scratches are preferably nonconcentric with the center of the rigid disk substrate 10, but preferably substantially circumferential, producing scratches that randomly cross each other.

Figure 2:
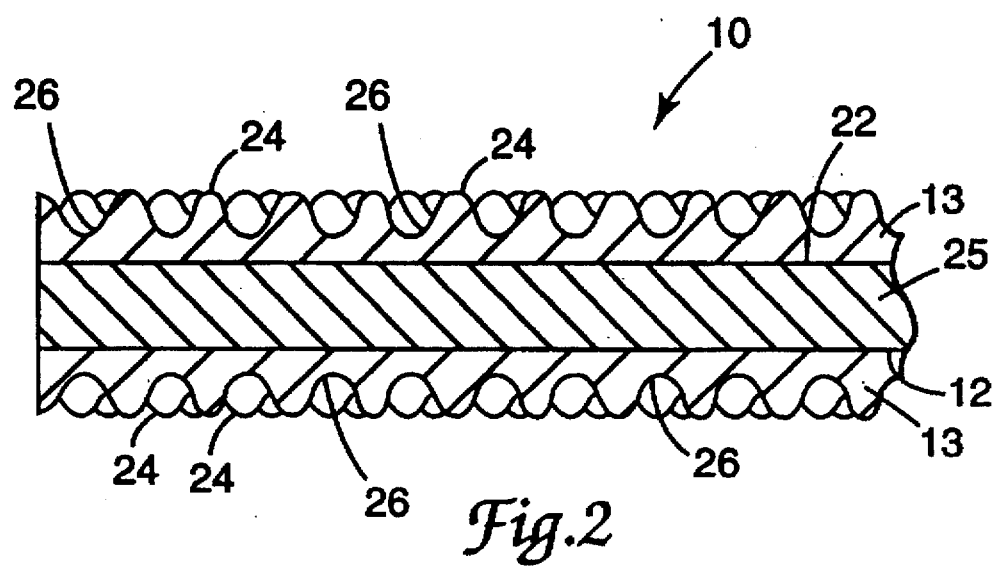
FIG. 2 is a cross-sectional view of a thin-film metal coated disk substrate taken along 2—2 of FIG. 1.

Referring now to the partial cross-sectional view of FIG. 2, the rigid substrate disk 10 comprises metal base 25 with a textured metal coating 13 formed on both substrate surfaces 12 and 22, although it will be understood that the coating could be present on only one major surface 12. Scratches 14 are irregular in nature and comprise high regions 24 and low regions 26. The Ra of the scratches 14 is preferably between about 20 angstroms (0.0020 micrometers) and about 70 angstroms (0.0070 micrometers), preferably 25 to 55 angstroms. The width and height of the scratches 14 do not have to be uniform, although the scratches should not be excessively wide or deep.

The texturing process results in an increase in the exposed surface area of the metal coating(s) 13. The rougher surface reduces stiction/friction with the computer head and the substantially circumferential direction of the scratches enables better differentiation between data tracks.

Although the illustration in FIG. 2 involves a substrate comprised of metal base coated with metal or metal alloy, it is to be understood that the present invention also contemplates applying the texturing method of the present invention to substrates made of glass or ceramic material which have no metal or metal alloy thin film coating formed on a surface thereof. It is also thought that the concepts of the invention also would be applicable to plastic substrate materials. Instead, the original surface(s) of the glass or ceramic substrate is directly subjected to the texturing method of the present invention. The glass substrate material can be made of a hard amorphous glass material such as a fused mixture of the silicates of the alkali and alkaline-earth or heavy metals. The ceramic substrate material can be constituted by various hard materials made by shaping and then firing a nonmetallic mineral, such as clay, at a high temperature. These ceramic materials include ceramic alloys, such as silicon nitride, silicon carbide, zirconinm, and alumina.

In more detail, the present method of the present invention employs a structured abrasive article to affect the texturing of the substrate surface. As used herein, a "structured abrasive article" means an abrasive article wherein a plurality of precisely-shaped abrasive composites are disposed on a backing in a predetermined pattern, where each composite has a predetermined shape and is constituted by abrasive particles distributed in a binder. In one embodiment, the array of composites are arranged in a "nonrandom" manner in the sense that the linear distance between adjacent composites is substantially the same throughout the array. Composites which are "adjacent" are those having no other composites present and intervening along a direct line extending therebetween.

The expression "precisely-shaped abrasive composite" (singular and plural forms), as used herein, refers to an abrasive composite having a shape with distinct and discernible boundaries that have been formed by curing the curable binder of a flowable mixture of abrasive particles and curable binder while the mixture is both borne on a backing and filling a cavity on the surface of a production tool. Such a precisely-shaped abrasive composite would have essentially the same shape as the cavity. Further, a plurality of such composites provide "three-dimensional" composite shapes, where each three-dimensional shape projects outward from the surface of the backing as part of an overall pattern which is the inverse of the pattern of the production tool. These "three-dimensional" shapes include individual composites separated from other composites in the array at least at their distal ends, and ridges of abrasive material, which typically are rectilinearly extending ridges. Typically, a thin monolithic layer of the abrasive material forms a continuous land extending beneath and between the composites formed from a production tool process, described herein. However, the composites are constituted by abrasive particle/binder portions extending as three-dimensional structures out from the land and/or surface of the backing material.

In this regard, each composite is defined by a boundary, the base portion of which being the interface with the backing to which the precisely shape composite is adhered. The remaining portion of the boundary is defined by the cavity on the surface of the production tool in which the composite was cured. The entire outer surface of the composite is confined, either by the backing or by the cavity, during its formation.

Figure 3:
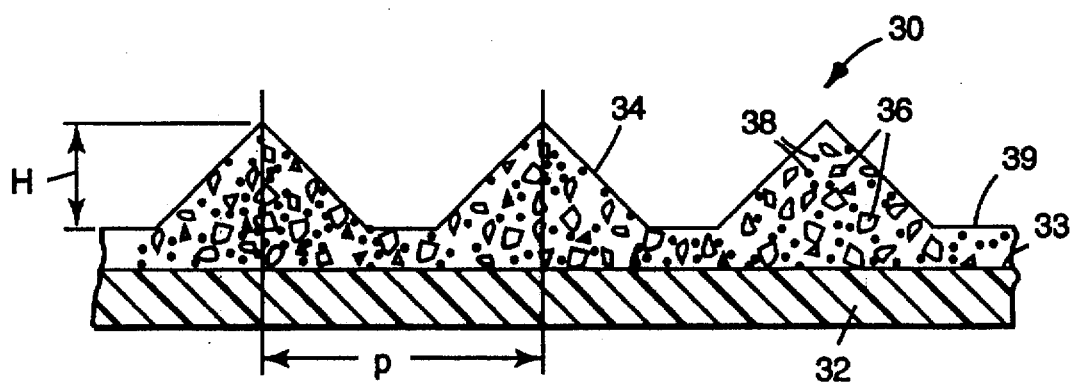
FIG. 3 is a cross-sectional view of one embodiment of an abrasive article used in the method of the present invention.

Referring to FIG. 3, an abrasive article 30 as used in the method of the present invention, includes a backing 32 having abrasive composites 34 thereon. The composites 34 comprise abrasive particles 36 and binder 38. Further, the composites 34 are ridges of abrasive material, where the base of the ridges is concave in shape and the ridges are oriented to transverse the lateral width of the abrasive article. A portion of the abrasive slurry, after being solidified, forms a land portion 39 extending continuously over the upper face 33 of the bacing 32.

Figure 4:
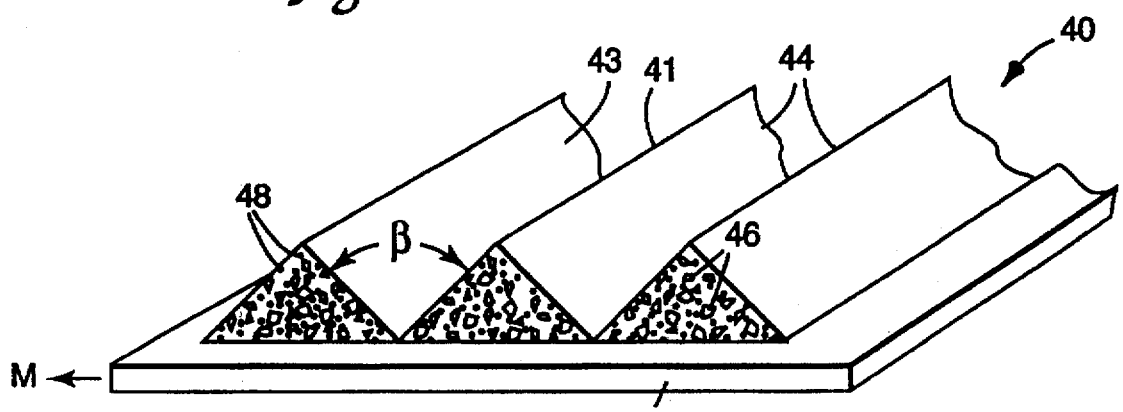
FIG. 4 is a perspective view with the closest end shown in section of another embodiment of an abrasive article used in the method of the present invention.

Referring to FIG. 4, an abrasive article 40 as used in the method of the present invention, includes a backing 42 having abrasive composites 44 thereon. The composites 44 comprise abrasive particles 46 and binder 48. The composites 44 form elongate continuous ridges of abrasive material, where the ridges are pyramidal as a solid triangular shape and each extends continuously without interruption across the lateral width of the abrasive article. The ridges are oriented at an acute angle of between about 20 to about 90 degrees to the side edges and machine direction M of the abrasive article. The abrasive ridges include a series of parallel adjacent ridges having upper sides 43 and 41 which meet at their lower ends to abut at backing 42 and generally form an angle ($\beta$) therebetween of from about 30 to about 110 degrees, as would be observed in a side profile view of the abrasive article.

Figure 5:
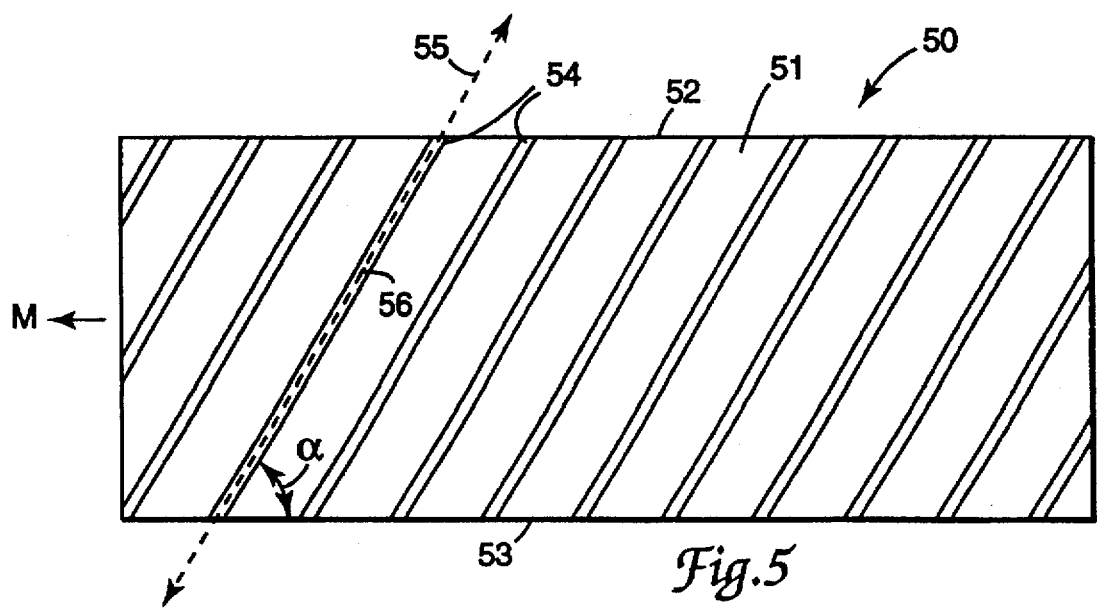
FIG. 5 is a top view of yet another embodiment of an abrasive article used in the method of the present invention.

Referring to FIG. 5, an abrasive article 50 as used in the method of the present invention, includes a backing (not shown) having abrasive composites 54 deployed thereon in the form of parallel elongate ridges of abrasive material which extend from one side edge 52 to the other 53. The composites 54 comprise abrasive particles and binder. The composites 54 are set at an acute angle $\alpha$ of between about 30 degrees to 60 degrees to the path of the abrasive article (i.e., the machine direction M). The machine direction M extends in a direction perpendicular to the two parallel side edges of the abrasive article.

Further, the abrasive article 50 has a surface 51 having a machine direction axis M and opposite side edges 52 and 53, each side edge being parallel to the machine direction axis M and each side edge being respectively within a first and second imaginary plane (not shown) each of which is perpendicular to the surface, and each ridge has a longitudinal axis 55 located at its transverse center and the ridge extends along an imaginary line which intersects the first and second planes at an angle, and each ridge has a midpoint 56 located on its outer surface defined by an imaginary line which is within a third imaginary plane (not shown) which contains the longitudinal axis 55 and is perpendicular to the surface. The ridges have distal ends spaced from the surface 51 which are unconnected to neighboring or adjacent ridges. Adjacent midpoints of adjacent ridges preferably are substantially equally spaced apart.

In a further embodiment, each distal end of each of the abrasive ridges extends tangentially to a fourth imaginary plane which is spaced from and parallel to the aforesaid surface.

In another embodiment of the invention, the abrasive ridges each comprise a continuous line of upraised abrasive material. In an alternate embodiment of the invention, the abrasive ridges each comprise a plurality of separate abrasive composites that are aligned with transverse centers located on said longitudinal axis or its imaginary extension line. In a preferred embodiment, the abrasive ridges are comprised of a plurality of individual composites that are intermittently spaced along the aforesaid longitudinal line, wherein each of the abrasive composites is precisely shaped and comprises a plurality of abrasive particles dispersed in a binder, which binder provides a means of attachment of the abrasive composites to the aforesaid surface.

Figure 6:
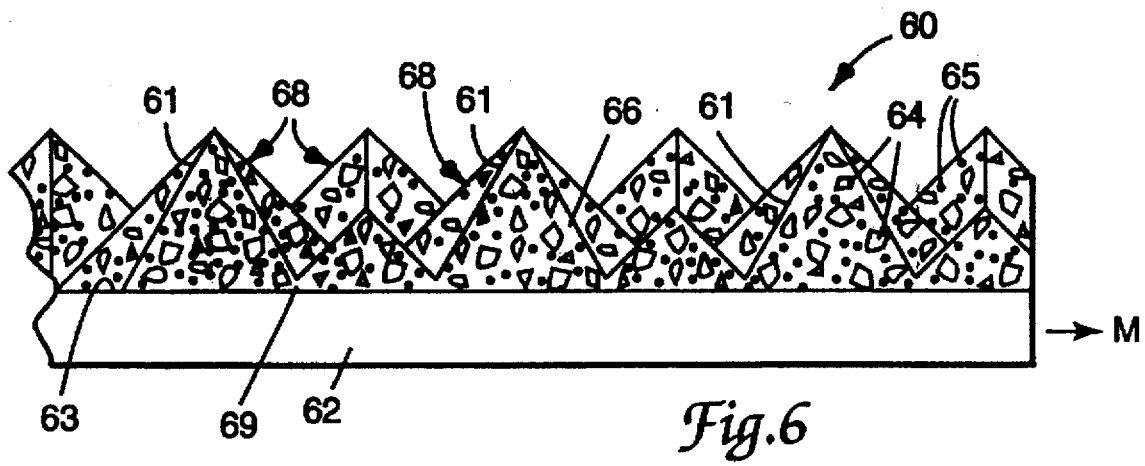
FIG. 6 is a partial side view of an abrasive article used in the method of the present invention.

Referring to FIG. 6, a partial side view of an abrasive article useful in the method of the present invention, an abrasive article 60 has a backing sheet 62 which includes a surface 63 having deployed in fixed position thereon a plurality of abrasive composites in the form of ridge segments 61, for example, bonded to front surface 63 thereof. Ridge segments 61 are aligned in separated rows, such as depicted in FIG. 5. Each abrasive composite 68 comprises a plurality of abrasive particles 64 dispersed in a binder 65. The abrasive composites form part of an abrasive coating 66 including the abrasive composites and an underlying land portion 69 thereto formed also of the disperion of abrasive particles in the binder. The land portion 69 contacts and extends over at least substantially all the front surface 63 of the backing 62. In one preferred embodiment, the abrasive coating 66, via the land portion 69, contacts greater than 99% up to including 100% of all available surface area of the upper surface 63.

Abrasive Article Backing

The backing of the abrasive article used in the method of this invention has a front and back surface and can be any conventional sheet-like material typically used as a backing for a coated abrasive product. Examples of such backings include polymeric film, cloth, paper, nonwoven sheets and treated versions thereof, and combinations thereof. Polymeric films may also be treated to improve adhesion, e.g., by priming or other conventional means. The backings may also be treated to seal and/or otherwise modify some physical properties of the backing. These treatments are well known in the art.

In general, the backing thickness should range between 7 and 400 micrometers. One preferred backing of the invention is a polyethylene terephthalate film having a thickness between about 25 and 125 micrometers, which preferably is primed, such as with (poly)ethylene acrylic acid, before applying the abrasive slurry thereto. Another preferred backing for the present invention is a paper backing having a thickness between 250 to 350 micrometers. The backing typically is flat and nonembossed. Still another useful backing is a commercially-available primer film available from Teijin America, Inc., Atlanta, Ga., under the trade name "TEJIN SP7". Also, a nonwoven backing can be used, such as disclosed in U.S. Pat. No. 5,307,593 (Lucker et al.). The backing can be foraminous or nonforaminous as long as the surface thereof can support an abrasive slurry formed into composites.

The back side of the abrasive article may also contain a coating of a material which improves a slip resistant or frictional engagement with driving devices. An example of such a coating would include a composition comprised of inorganic particulate (e.g., calcium carbonate or quartz) dispersed in an adhesive.

Abrasive Composite

Abrasive Particles

The abrasive particles typically have an average particle size in a range of about 0.5 to 8.0 micrometers, and preferably between about 1.5 to about 6.0 micrometers. It is preferred that the abrasive particles have a Mohs' hardness of at least about 8, more preferably above 9. Examples of such abrasive particles include fused aluminum oxide (which includes brown aluminum oxide, heat treated aluminum oxide, and white aluminum oxide), ceramic aluminum oxide, green silicon carbide, silicon carbide, chromia, fused alumina:zirconia, diamond, iron oxide, ceria, cubic boron nitride, boron carbide, garnet, and combinations thereof. White aluminum oxide is preferred in this invention for use in abrading metal substrates by the inventive method, while diamond is preferred for use where the substrate to be abraded is glass or ceramic.

It is also within the scope of this invention to have a surface coating on the abrasive particles to provide any of a variety of different functions. Surface coatings may be employed to increase adhesion to the binder, alter the abrading characteristics of the abrasive particle. Examples of surface coatings include coupling agents, halide salts, metal oxides including silica, refractory metal nitrides, refractory metal carbides, and the like.

In the abrasive composite there may also be diluent particles, e.g., to reduce cost and/or improve performance. The particle size of these diluent particles may be on the same order of magnitude as the abrasive particles. Examples of such diluent particles include gypsum, marble, limestone, flint, silica, glass bubbles, glass beads, aluminum silicate, and the like.

Binder

The abrasive particles are dispersed in an organic binder to form the abrasive composite. The organic binder preferably is a thermosetting binder; although thermoplastic binders are also within the contemplation of the invention.

In the case of thermosetting binders, the binder is generally formed from a binder precursor. During the manufacture of the abrasive article, a thermosetting binder precursor is exposed to an energy source which aids in the initiation of the polymerization or curing process. Examples of energy sources include thermal energy and radiation energy which includes electron beam, ultraviolet light, and visible light. After this polymerization process, the binder precursor is converted into a solidified binder. Alternatively, for a thermoplastic binder precursor, during the manufacture of the abrasive article the thermoplastic binder precursor is cooled to a degree that results in solidification of the binder precursor. Upon solidification of the binder precursor, the abrasive composite is formed.

The binder in the abrasive composite is generally also responsible for adhering the abrasive composite to the front surface of the backing. However, in some instances there may be an additional adhesive layer between the front surface of the backing and the abrasive composite.

Examples of typical binder precursors usable in the invention include phenolic resins, urea-formaldehyde resins, melamine formaldehyde resins, acrylated urethanes, acrylated epoxies, ethylenically unsaturated compounds, aminoplast derivatives having $\alpha,\beta$-pendant unsaturated carbonyl compounds, isocyanurate derivatives having at least one pendant acrylate group, isocyanate derivatives having at least one pendant acrylate group, vinyl ethers, epoxy resins, and mixtures and combinations thereof. The term acrylate encompasses acrylates and methacrylates.

The abrasive particles generally are mixed with the binder of the invention in a gravimetric ratio of between about 8:1 to about 1:1 abrasive particles:binder, preferably 2:1, respectively.

One preferred category of binder precursors for this invention is acrylate resins. Examples of suitable acrylate resins are trimethylol propane triacrylate, triacrylate of tris (hydroxy ethyl)isocyanurate, ethoxylated bisphenol A diacrylate, isobornyl acrylate, phenyoxethyl acrylate, tetra ethylene glycol acrylate and mixtures thereof.

A source of phenoxyethyl acrylate resin is commercially available from Sartomer Corp. under the trade designation "SR 339"; a source of ethoxylated bisphenol A diacrylate resin is commercially available from Sartomer Corp. under the trade designation "SR 349"; and a source of isobornyl acrylate resin is commercially available from Sartomer Corp. under the trade designation "SR 506". A mixture of these different types of acrylate resins is preferred to provide an optimal balance of binder properties. One preferred mixing ratio, by weights, of these different acrylate binder precursors includes, in general, about 10 to 50% ethoxylated bisphenol A acrylate to about 90 to 50% combined amount of any combination of isobornyl acrylate and phenoxyethyl acrylate resins. In one preferred embodiment, the amount, by weight of ethoxylated bisphenol A acrylate is about 20 to 30% based on total binder resins including the amounts of ethoxylated bisphenol A acrylate, isobornyl acrylate and phenoxyethyl acrylate resins.

Additives

The abrasive composite can further comprise optional additives, such as, for example, photoinitiators, fillers (including grinding aids), fibers, lubricants, wetting agents, thixotropic materials, surfactants, pigments, dyes, antistatic agents, coupling agents, plasticizers, and suspending agents. The amounts of these materials are selected to provide the properties desired. The use of these can affect the erodability of the abrasive composite. In some instances an additive is purposely added to make the abrasive composite more erodable, thereby expelling dulled abrasive particles and exposing new abrasive particles.

Depending upon the energy source that is utilized and the binder precursor chemistry, a curing agent, photoinitiator, or catalyst is sometimes preferred to help initiate polymerization of the binder precursor. For instance, examples of suitable photoinitiators that generate a free radical source when exposed to visible radiation, are described in U.S. Pat. No. 4,735,632 (Oxman et al.), which is incorporated herein by reference. The preferred initiator for use with visible light is commercially available from Ciba Geigy Corp. under the trade designation "IRGACURE 369". The photoinitiator can be typically used in an amount of between about 0.5% to 5% based on total weight of the abrasive slurry (binder, additives and abrasive particles). On the other hand, if the energy source is electron-beam ("E-beam"), free radicals to initiate polymerization in the binder are generated and provided by the energy source itself.

The term filler also encompasses materials that are known in the abrasive industry as grinding aids. A grinding aid is defined as particulate material that the addition of which has a significant effect on the chemical and physical processes of abrading which results in improved performance. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include, tin, lead, bismuth, cobalt, antimony, cadmium, iron, and titanium. Other miscellaneous grinding aids include sulfur, organic sulfur compounds, graphite, and metallic sulfides.

Examples of antistatic agents include graphite, carbon black, vanadium oxide, humectants, and the like. These antistatic agents are disclosed in U.S. Pat. Nos. 5,061,294 (Harmer et al.); 5,137,542 (Buchanan et al.), and 5,203,884 (Buchanan et al.), all incorporated herein by reference.

A coupling agent can provide an association bridge between the binder precursor and the filler particles or abrasive particles. Examples of coupling agents include silanes, titanates, and zircoaluminates. A preferred silane coupling agent is commercially available from Union Carbide under the trade designation "A-174". The abrasive slurry (binder, additives, plus abrasive particles) preferably contains anywhere from about 0.01 to 3% by weight coupling agent based on total weight of the abrasive slurry.

An example of a suspending agent is an amorphous silica particle having a surface area less than 150 square meters/ gram that is commercially available from DeGussa Corp., under the trade name "OX-50".

Abrasive Composite Shape and Arrangement

The abrasive composite can be formed as a plurality of rectilinear abrasive ridges, each ridge being formed of a continuous line of abrasive material extending between the side edges of the backing, or alternatively, each ridge is formed of a plurality of individual abrasive composite shapes intermittently located along an imaginary line extending between the side edges of the backing. These rectilinear composite ridges are positioned as parallel rows on a flexible backing.

In the embodiment involving abrasive composites that are shaped as continuous rectilinear ridges of abrasive material, the ridges are formed such as by appropriately shaping an uncured abrasive slurry with a production tool, described later herein, which is configured to present the converse shape of the desired pattern of ridges. The mold or production tool is removed after the slurry is sufficiently cured or gelled to hold the basic contour imparted into the abrasive slurry by the tool cavities. The abrasive slurry used to form the continuous ridges of abrasive material can be slightly overfilled into the production tooling, described in more detail hereinafter, to the extent that land portions are formed between the adjacent ridges at their lower portions, viz. up to about 25% of the height of the ridges, by virtue of a continuous monolayer of abrasive material formed extending underneath and between the three-dimensional composite ridges extending from the horizontal outer surface of the lands.

In an alternate embodiment involving ridges comprised of abrasive material present as individual abrasive composites formed intermittently along rows tracing rectilinear lines, each individual abrasive composite has its own shape associated with it. The individual shape has a surface or boundaries associated with it that results in one abrasive composite being separated to some degree from another adjacent abrasive composite. That is to say, to form an individual abrasive composite, a portion of the planes or boundaries forming the shape of the abrasive composite must be separated from one another. This separation portion must include at least the upper portion or distal ends of the composites. The lower or bottom portion of abrasive composites may abut one another, or, alternatively, the composites may be spaced apart to expose the land portions. If the individual abrasive composites are spaced-apart, then typically, the abrasive slurry used to form same is slightly overfilled into the production tooling, described in more detail hereinafter, to the extent that a land portion of abrasive material is formed extending as a continuous monolayer underneath and between the composites at their lower portions. The land portion thickness equals about 25% of the height of distension of the composites from the land portions. In any event, individual abrasive composites can be formed in an abrasive coating by methods disclosed in U.S. Pat. No. 5,152,917 (Pieper et al.), which is incorporated herein by reference in this regard.

The individual abrasive composites usually are equidistantly spaced apart along the common ridge for convenience sake. If distinct or individual abrasive composites are used to constitute each of the abrasive ridges, the abrasive composite shapes preferably should be uniformly selected to be a regular geometric shape such as cubic, prismatic, conical, truncated conical, pyramidal, truncated pyramidal, composite shaped such as a truncated conical base with dome-shaped tip, and the like. The preferred shape is pyramidal or truncated pyramidal with 4 to 20 side surfaces (including the base side but not any flat top in the case of truncated pyramidal). Grooves or open spaces left between the ridges of abrasive material also will extend linearly at an angle tracking the angle of extension of the adjoining ridges. Also, the height of the composites is preferred to be constant across the entire area of the abrasive article. These shapes are precise as they closely counter-correspond to the cavity shape presented in the production tool used to shape the abrasive slurry.

The number of individual abrasive composites can be anywhere from 5 to 15,000 composites per square centimeter, or even more, but most preferably from about 1,000 to 10,000 composites per square centimeter. The number of abrasive composites can be correlated to the rate of cut, abrasive life, and also surface finish of the workpiece being abraded. For the embodiment providing the ridges of abrasive material using intermittent individual composites aligned in rows, the spacing between adjacent composites preferably is selected to be a value which is constant in all ridges, and generally is in a range of 5 to 200 micrometers.

For all embodiments of abrasive ridges of this invention, the adjacent abrasive composite ridges are at least separated at their distal ends, although they may be abutted or separated at their attachment ends to the backing. It is possible that adjacent abrasive composites may be completely separated near both the distal end and the attachment end such that the backing is exposed in-between abrasive ridges.

The spacing or pitch between the abrasive composite ridges, whether the continuous or intermittent variety, as measured from one mid-point of one ridge to that of the adjacent or nearest composite ridge, indicated as "p" in FIG. 3, is selected to be a uniform value through any particular array of composites. For purposes of this invention, an adjacent ridge means a ridge which faces a subject ridge over a common groove without any intervening ridges located therebetween. The pitch "p" generally is set as a value between about 3 and about 500 micrometers, preferably between about 25 and 50 micrometers for hard or rigid disk texturing.

For purposes of this invention, the composite height H for either the continuous ridge embodiment, such as shown in FIG. 3, or the use of individual composites arrayed in rows of ridges, such as shown in FIG. 6, is measured as the vertical distance between either the outer surface of the backing or any land surface on the composite side of the abrasive article to the outermost extent of the distal end of the composite, and generally is a value in the range from about 10 to 1020 micrometers, preferably between 10 and 100 micrometers.

For rigid disk texturing, the aforementioned abrasive ridges provide optimal effect when arranged to incline, as seen in a plan view, to the parallel side edges of the abrasive article at a preferred angle within the range of from about ±45 to about 90 degrees. That is, the ridges can be arranged to cut across the width of the abrasive article at angles including perpendicular to the direction of extent of the side edges of the abrasive article and the machine direction.

However, while certain range values have been described above in connection with using the abrasive composite ridges to texture rigid memory disks, it is to be understood the method of the invention may be applicable to many other roll to roll indexing or running applications, such as floppy disk or magnetic tape burnishing, magnetic head polishing, roll polishing, and the like. The optimal pattern size and angle may vary and can be empirically determined for each application and mineral size of abrasive employed.

Methods for Making the Abrasive Composites

In one embodiment, the first step to make the abrasive article is to prepare the abrasive slurry having a composition described hereinabove. The abrasive slurry is made by combining together by any suitable mixing technique the binder precursor, the abrasive particles and the optional additives. Examples of mixing techniques include low shear and high shear mixing, with high shear mixing being preferred. Ultrasonic energy may also be utilized in combination with the mixing step to lower the abrasive slurry viscosity. Typically, the abrasive particles are gradually added into the binder precursor. The amount of air bubbles in the abrasive slurry can be minimized by pulling a vacuum during the mixing step. In some instances it is preferred to heat, generally in the range of 30 to 70 degrees celsius, the abrasive slurry to lower the viscosity. It is important that the abrasive slurry have a rheology that coats well and in which the abrasive particles and other fillers do not settle.

To obtain an abrasive composite having a precise shape, either in the continuous ridge form or, alternatively, as a ridge comprised of a row of intermittent individual abrasive composite (shapes), a known method is employed where the binder precursor is solidified or cured while the abrasive slurry is present in cavities of a production tool.

If a thermosetting binder precursor is employed, the energy source can be thermal energy or radiation energy depending upon the binder precursor chemistry. If a thermoplastic binder precursor is employed, the thermoplastic is cooled such that it becomes solidified and the abrasive composite is formed.

Production Tool

The production tool contains a plurality of cavities, which are essentially the inverse shape of the abrasive composite and are responsible for generating the shape of the abrasive composites. There should be preferably 5 to 15,000 cavities per square centimeter. It is preferred to have between 5 and 10,000 ridge-forming cavities spaced in parallel per square centimeter. These cavities make it possible to form an abrasive article therewith having a corresponding number of abrasive composites/square centimeter. These cavities can have any of a variety of geometric shapes as cubic, prismatic, pyramidal, truncated pyramidal, conical, and the like to form individual abrasive composites. Alternatively, the cavities can be linear continuous groove-shapes to form continuous ridges, such as where individual grooves have a triangular profile and the an overall contour of the surface of the production tool is a saw-tooth contour. The dimensions of the cavities are selected to achieve the desired number of abrasive composites/square centimeter. The cavities can be present in a dot-like pattern with spaces between adjacent cavities or the cavities can abut against one another at their entrance side edges.

The production tool can be a belt, a sheet, a continuous sheet or web, a coating roll such as a rotogravure roll, or a sleeve mounted on a coating roll. The production tool can be composed of metal (e.g., nickel), metal alloy, ceramic, or plastic. A metal production tool can be fabricated by any conventional technique such as engraving, hobbing, etching electroforming, diamond turning, etc. A thermoplastic tool can be replicated off a metal master tool. The master tool will have the inverse pattern desired for the production tool. The master tool is preferably made out of metal, e.g., nickel. The thermoplastic sheet material can be heated and optionally along with the master tool such that the thermoplastic material is embossed with the master tool pattern by pressing the two together. The thermoplastic can also be extruded or cast onto to the master tool and then pressed, after which, the thermoplastic material is cooled to solidify and produce a production tool.

The production tool may also contain a release coating to permit easier release of the abrasive article from the production tool. Examples of such release coatings include silicones and fluorochemicals. If a plastic production tool is used, it is preferred that the polymer used is grafted with the silicone or fluorochemical.

Energy Sources

When the abrasive slurry comprises a thermosetting binder precursor, the binder precursor is subsequently cured or polymerized. This polymerization is generally initiated upon exposure to an energy source. Examples of energy sources include thermal energy and radiation energy. The amount of energy depends upon several factors such as the binder precursor chemistry, the dimensions of the abrasive slurry, the amount and type of abrasive particles, and the amount and type of the optional additives. For thermal energy, the temperature can range from about 30 to 150 degrees celsius, generally between 40 to 120 degrees celsius. The time can range from about 5 minutes to over 24 hours. The radiation energy sources include electron beam, ultraviolet light, or visible light. Electron beam radiation, which is also known as ionizing radiation, can be used at an energy level of about 0.1 to about 10 Mrad, preferably at an energy level of about 1 to about 10 Mrad. Ultraviolet radiation refers to non-particulate radiation having a wavelength within the range of about 200 to about 400 nanometers, preferably within the range of about 250 to 400 nanometers. It is preferred that 300 to 600 Watt/inch (120 to 240 watt/cm) ultraviolet lights are used. Visible radiation refers to non-particulate radiation having a wavelength within the range of about 400 to about 800 nanometers, preferably in the range of about 400 to about 550 nanometers, and is preferably used at an energy level of 300 to 600 watt/inch (120 to 240 watt/cm).

Methods for Forming the Abrasive Article

One method for making an abrasive article for use in the method of the present invention involves, in general, 1) introducing the abrasive slurry onto a production tool, wherein the production tool has a specified pattern, 2) introducing a backing to the outer surface of the production tool such that the slurry wets one major surface of the backing to form an intermediate article; 3) at least partially curing or gelling the resinous adhesive before the intermediate article departs from the production tool to form a lapping coated abrasive article; and 4) removing the coated abrasive article from the production tool. In an alternate method, it involves, in general, 1) introducing the abrasive slurry onto the backing such that the slurry wets the front side of the backing form an intermediate article; 2) introducing the intermediate article to a production tool having a specified pattern; 3) at least partially curing or gelling the resinous adhesive before the intermediate article departs from the production tool to form a lapping coated abrasive article; and 4) removing the lapping coated abrasive article from the production tool. In these two methods, the resulting solidified abrasive slurry or abrasive composite will have the inverse pattern of the production tool. By at least partially curing or solidifying on the production tool, the abrasive composite has a precise and predetermined pattern. The resinous adhesive can be further solidified or cured off the production tool.

In one preferred method for making rows of abrasive composite ridges on a backing for an abrasive article for use in the method of the present invention, a backing leaves an unwind station and at the same time the production tool (pattern tool), which is transparent to radiation, leaves an unwind station. The production tool is coated with abrasive slurry by means of a coating station. The coating station can be any conventional coating means such as drop die coater, knife coater, curtain coater, vacuum die coater, or a die coater. A preferred coating technique is use of a knife coater. After the production tool is coated, the backing and the abrasive slurry are brought into contact by any means such that the abrasive slurry wets the front surface of the backing. The abrasive slurry is brought into contact with the backing by means of a contact nip roll. Next, another nip roll also is used to force the resulting construction against support drum. Next, some form of energy is transmitted into the abrasive slurry through the production tool by an energy source to at least partially cure the binder precursor. The term partial cure is meant that the binder precursor is polymerized to such a state that the abrasive slurry does not flow from an inverted test tube. The binder precursor can be fully cured once it is removed from the production tool by any energy source. Following this, the production tool is rewound on mandrel so that the production tool can be reused. Additionally, the abrasive article is wound on a mandrel for storage and handling before usage in the method of the invention. If the binder precursor is not fully cured, the binder precursor can then be fully cured by either time and/or exposure to an energy source. Additional steps to make the abrasive article according to this method are further described in U.S. Pat. No. 5,152,917 (Pieper et al.), which is incorporated herein by reference.

It is preferred that a thermosetting binder precursor is cured by radiation energy. The radiation energy can be transmitted through the backing or through the production tool. The backing or production tool should not appreciably absorb the radiation energy. Additionally, the radiation energy source should not appreciably degrade the backing or production tool. Alternatively, if the production tool is made from certain thermoplastic materials, such as polyethylene, polypropylene, polyester, polycarbonate, poly(ether sulfone), poly(methyl methacrylate), polyurethanes, polyvinylchloride, or combinations thereof, ultraviolet or visible light can be transmitted through the production tool and into the abrasive slurry. For thermoplastic based production tools, the operating conditions for making the abrasive article should be set such that excessive heat is not generated. If excessive heat is generated, this may distort or melt the thermoplastic tooling.

After the abrasive article is cured to its final state, the coated abrasive article is converted into a form which is usable in an abrading operation, such as a sheet, belt, tape, or the like.

Texturing Apparatus

Figure 7:
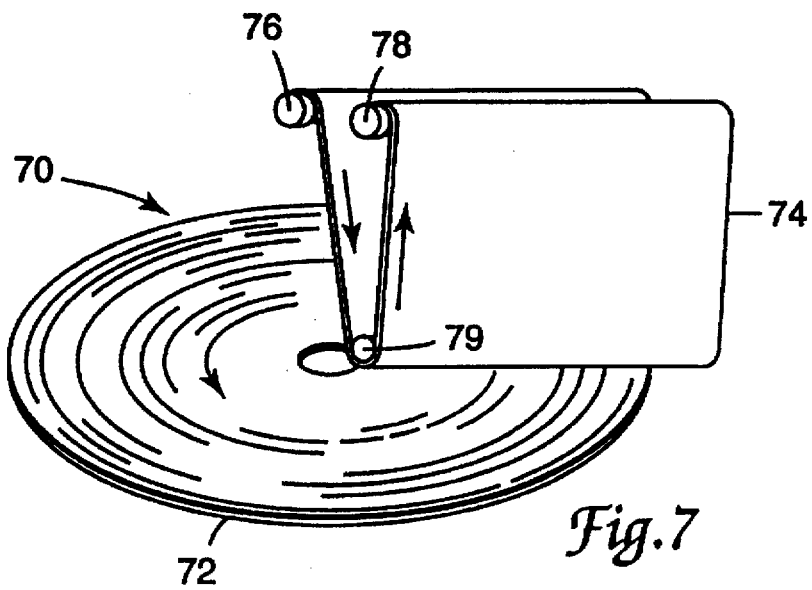
FIG. 7 is a schematic of a texturing apparatus for use with the method of the present invention.

FIG. 7 is a schematic representing a texturing apparatus 70 for use in the method of the present invention. Although the texturing of only one side of the substrate 72 is depicted, it is understood that both sides of the substrate 72 can be typically textured simultaneously by separate abrasive articles or by the same abrasive article. The texturing process is preferably done wet or under a water flood in the presence of a surfactant. Substrate 72 is generally between 50 to 200 millimeters in diameter, usually between 60 to 150 mm. The substrate 72 is installed on a machine such as HDF brand machine from the Exclusive Design Company (EDC). The machine spins the substrate 72 between about 50 to 700 rpm, resulting in a surface speed on the disk of between about 7.5 to about 440 meters/minute; although faster or slower speeds also are contemplated. The abrasive article 74 of the invention is preferably provided in a continuous roll form having a width between 20 to 60 millimeters, preferably between 25 to 50 mm. The continuous roll of the abrasive article 74 is unwound from one station 76 to a second station 78. In between, the abrasive article 74 contacts the surface of the substrate 72 with the aid of a roller 79 as substrate 72 rotates. Roller 79 has a preferred diameter of about 50 mm and is preferably constructed of an elastomeric material having a Shore A durometer of about 50. The force between the abrasive article 74 and the substrate 72 is between 0.1 to 4 kg, preferably between 0.5 and 3 kg, for a contact length of 31.1 mm using a rubber roll having a diameter of 50 mm and a Shore A hardness value of 50. If the pressure is too high, the resulting surface finish, Ra, will be too high, i.e., greater than about 7 nanometers (0.0070 micrometers). If the pressure is too low, then the scratch height will be low and the surface finish will be too low, i.e., less than about 1.8 nanometers (0.0018 micrometers). The preferred method includes oscillating roller 79 in a radial direction relative to the substrate 72 during the texturing process. The radial oscillation ensures that the scratches formed by the abrasive article 74 are not concentric on the substrate 72, but are, instead, substantially circumferential with random crossings. During texturing, the abrasive article 74 is also indexed at a controlled rate between stations 76 and 78 to provide a known and uniform texturing rate to substrate 72. The indexing speed of the abrasive article 74 is between 5 to 400 cm/minute, preferably between 15 to 250 cm/min. The combination of the indexing abrasive article 74 and the oscillating roller 79 provides the random, substantially circumferentially spaced scratches desired. The rigid substrate 72 is typically cleaned to remove any debris or swarf after texturing. After cleaning, any conventional magnetic coating can be applied over the scratches. In a typical rigid magnetic media disk, a coating, such as chrome, is applied over a textured surface of the substrate. An additional coating of a magnetic material is applied over the chrome coating, for example, a CoXY alloy, where Co is cobalt, X can be platinum or tantalum, and Y can be chrome or nickel. Finally a carbon coating is applied over the magnetic coating.

The following definitions are used when evaluating texturing of substrates of the current invention:

Ra is the arithmetic average deviation of the absolute values of the roughness profile from the mean line or center line. The center line divides profiles such that all areas above it are equal to all areas below it.

Rms is the root mean square or geometric average deviation of the roughness profile from the mean line measured in the sampling length.

P-V, peak/valley (also known as Rt) is the vertical distance between the highest peak and the lowest valley in the sampling length leveled on the mean line.

Rp is the distance between the mean line and the highest peak within the sampling length.

Rv is the distance between the mean line and the lowest valley within the sampling length.

The following non-limiting examples will further illustrate the invention. All parts, percentages, ratios, and the like, in the examples are by weight unless otherwise indicated. The following abbreviations are used throughout:

EXAMPLES

PH2: 2-benzyl-2-N,N-dimethylamino-1-(4-morpholinophenyl)-1-butanone, commercially available from Ciba Geigy Corp. under the trade designation "Irgacure 369";

SCA: silane coupling agent, 3-methacryloxypropyltrimethoxysilane, commercially available from Union Carbide under the trade designation "A-174";

SR1: phenoxyethyl acrylate resin, commercially available from Sartomer Corp., under the trade designation "SR 339";

SR2: ethoxylated bisphenol A diacrylate resin, commercially available from Sartomer Corp., under the trade designation "SR 349";

SR3: isobornyl acrylate resin, commercially available from Sartomer Corp., under the trade designation "SR 506";

FS: fumed silica thickener, commercially available from Degussa Corp., under the trade designation "R-812";

WAO: white aluminum oxide, grade 6000, available from Fujimi Corp., Japan;

DP: diamond abrasive particles, average particle size 6 micrometers, available from Beta Diamond (Yorba Linda, Calif.), under the trade designation "RVG".

General Procedure for Making the Abrasive Article

First, an abrasive slurry was prepared by thoroughly mixing the materials indicated in the Example. All of the ratios are based upon weight. The abrasive slurry was coated onto a polypropylene production tool having the topography denoted, at a rate of about 15.25 meters/minute, such that the abrasive slurry filled recesses in the tool. Next a 25 micrometer thick polyester terephthalate (PET) film substrate was pressed against the production tool by means of a nip roller and the abrasive slurry wetted the front surface of the polyester film which had a primer thereon. Ultraviolet light, about 236 watts/cm, was transmitted through the polypropylene tooling and into the abrasive slurry. The ultraviolet light initiated the polymerization of the resinous adhesive. This ultraviolet light resulted in the abrasive slurry being transformed into an abrasive composite and the abrasive composite being adhered to the PET film substrate. Next, the PET film/abrasive composite construction was separated from the production tool. The construction was then converted to form an abrasive article.

Texturing Procedure

The texturing test was performed on a rigid disk using the method of the present invention. A model 800C HDF Rigid Disk Burnisher, manufactured by Exclusive Design Co., San Mateo, Calif., was used. The rigid disk substrate was a nickel/phosphorus (NIP) plated aluminum disk (95 mm diameter) rotated at 600 rpm. The abrasive article of the present invention was cut into a 51 mm wide abrasive strip having an extended length. Rolls of the abrasive strip were installed on a tape cassette that had a supply reel with the unused abrasive article and a take-up reel with the used abrasive article. Two sets of abrasive tape cassettes were tested. One cassette was used to texture the top surface of the rigid disk, and the other cassette was used to texture the bottom surface of the rigid disk. The feed rate of the abrasive tape was 42 cm/min. During the texturing process an aqueous coolant mist was dripped onto a cleaning fabric which was applied to the surface of the rigid disk to transfer the aqueous coolant to the surface of the disk. The aqueous coolant consisted of a 5% solution of RECOOL 85, commercially available from Man-gill Chemical Co. Two cleaning tape cassettes (Type TJ Cleaning Tape, manufacture by Thomas E. West Co.) were also used in this test. One cassette was used to clean the top surface of the rigid disk, and the other was used to clean the bottom surface of the rigid disk. At the surfaces of the rigid disk, the abrasive tapes and cleaning tapes were passed over a Shore A 50 durometer elastomer roller which was oscillated in a radial direction relative to the disk using a mechanical vibrator with approximately 3 to 6 mm of travel. The endpoint of the test was 20 seconds. The surface of the textured rigid disk was then measured to determine the surface properties of each sample.

Examples 1–6

Abrasive slurry formulations S1, S2 and S3 were made by thoroughly mixing the raw materials listed in Table 1. Then, according to the General Procedure for Making the Abrasive Article described above, one batch of each of these formulations were used to form abrasive articles 1, 2, and 3 representing this invention, which were formed from a coating into a tooling having cavities 63.5 micrometer high, three sided, pointed, pyramidal pattern. The pyramidal pattern was such that the bases butted up against one another. Each side of the base was about 127 micrometers long. Also, Examples 4, 5, and 6 representing the present invention were formed from a separate batch of formulations S1, S2 and S3 that were coated into a tooling having cavities about 80 micrometer high, four sided, truncated pyramidal pattern. Each side of the base of the pyramid was about 127 micrometers long, each side of the top was about 50 micrometers long, and the pyramids had about 50 micrometers of land area between the next adjacent composite. The viscosity values in Table 1 are reported in centapoise (cps).

TABLE 1

|  | S1 | S2 | S3 |
| --- | --- | --- | --- |
| WAO | 400 | 400 | 400 |
| SR1 | 150 | 75 | — |
| SR3 | — | 75 | 150 |
| SR2 | 50 | 50 | 50 |
| PH2 | 4 | 4 | 4 |
| SCA | 8 | 8 |  |
| viscosity | 2920 | 1160 | 1270 |

Comparative A was a conventional lapping abrasive on a polyester film backing comprising 2 micrometer aluminum oxide abrasive particles. It is commercially available from The 3M Company, St. Paul, Minn. under the trade designation "IMPERIAL" TR3 Lapping Film. Examples 1, 2, 3, 4, 5, 6 and Comparative Example A were each used to texture rigid disks according to the Texturing Procedure described above. The results are listed in Table 2 below. The Ra values in Table 2 are reported in nanometers (nm).

TABLE 2

| Example | Ra |
|---|---|
| 1 | 2.00 |
| 2 | 1.70 |
| 3 | 1.56 |
| 4 | 2.06 |
| 5 | 5.38 |
| 6 | 2.12 |
| A | 3.37 |

Examples 7 and 8

The abrasive article of Example 7 was prepared in the same manner as Example 1 using an abrasive slurry of formulation S1, except that the production tooling used had a series of parallel elongate pyramidal grooves as the cavities, such as illustrated in FIG. 4. The cavities abutted one another at the sides of their mouths. The resulting pyramidal composites were about 173 micrometers high and 300 micrometers wide at the base; the bases of adjacent pyramids abutted; and the angle formed between the abutting sides of adjacent composites was 90 degrees. Upon shaping the abrasive slurry and removal from the production tool, each composite ridge transversed the lateral width of the coated abrasive backing. The abrasive article was formed such that the ridges of composite were oriented directly perpendicular to the machine direction and sides edges of the backing of the abrasive article.

The abrasive article of Example 8 was formed in the same manner as Example 7 except that the abrasive ridges of the composite were oriented at an acute 60 degrees angle to the machine direction and side edges of the backing of the abrasive article. Examples 7 and 8 and Comparative AA, which was made the same as Comparative Example A were tested in accordance with the Texturing Procedure.

The expanded results are listed below in Table 3. The Ra, P-V, Rp and Rv values are reported in Table 3 are expressed in nanometers (nm).

TABLE 3

| Example | Rms | Ra | P-V | Rp | Rv |
|---|---|---|---|---|---|
| 7 | 3.82 | 3.03 | 28.0 | 11.7 | 16.4 |
| 8 | 3.47 | 2.77 | 26.5 | 10.5 | 16.0 |
| AA | 4.72 | 3.76 | 32.9 | 15.2 | 17.7 |

As shown by the results in Table 3, the structured abrasive articles of the present invention exemplified in Examples 4 and 5 out-performed the conventional lapping film in the texturing procedure in all categories.

Examples 9-13

The abrasive articles of Examples 9 through 13 were prepared in the same manner as Example 7 except for the following explained differences in the dimensions of the production tooling, and thus, abrasive ridges formed therewith. For Example 9, the composites had a height of about 1.8 micrometers and a pitch of about 3.6 micrometers. For Example 10, the composites had a height of about 3.7 micrometers and a pitch of about 7.3 micrometers. For Example 11, the composites had a height of about 7.3 micrometers and a pitch of about 14.6 micrometers. For Example 12, the composites had a height of about 11.2 micrometers and a pitch of about 26.8 micrometers, and the abutting sides of adjacent composites formed an angle of 100 degrees.

For Example 13, the composites had a height of about 23.3 micrometers and a pitch of about 46.5 micrometers. Each of Examples 9–13 were prepared in duplicate in two modes, so that when used in the Texturing Procedure, the ridges were at 90 degrees in one run and a 60 degrees angle in another run to the machine direction and side edges of the backing of the abrasive article.

Further, a run at 45 degrees additionally was conducted for Example 13 alone. Table 4 below compares the 90 degrees and 60 degrees orientations for Examples 6 though 10 when used in the Texturing Procedure. The Ra values are reported in nanometers (nm) in Table 4.

TABLE 4

| Example | Ra 90 | Ra 60 | Ra 45 |
|---|---|---|---|
| 9 | 1.49 | 1.41 | — |
| 10 | 1.15 | 1.09 | — |
| 11 | 1.55 | 1.31 | — |
| 12 | 1.27 | 1.29 | — |
| 13 | 1.38 | 1.40 | 2.52 |

For Example 9, only a few scratches were observed on the textured disk surface. The 60 degrees sample had a slightly lower Ra than the 90 degrees sample. There were very few NiP chips found on the used abrasive surface for both samples. The size of the NiP chips was sometimes larger than the abrasive composites of the abrasive article. For Example 10, very few scratches were observed on the disk surface textured by the 90 degrees sample. The 60 degrees sample of Example 9 produced superior oriented scratches than the 90 degrees sample in Example 10. Thus, it was determined that the direction of the pattern could strongly affect the scratch density and quality achieved. In Example 10, not many NiP chips were found on the 90 degrees sample after use, with more NiP chips found on the 60 degrees sample. For Example 11, very few scratches were again observed on the disk surface textured by the 90 degrees sample, and the 60 degrees sample produced much better oriented scratches than the 90 degrees sample. Not many NiP chips were found on the 90 degrees sample after use, with more NiP chips found on the 60 degrees sample. The 60 degrees sample was observed to be more aggressive than the 90 degrees sample.

In Example 12, the scratch density produced by the 90 degrees sample was lower than the density of the 60 degrees sample. The 60 degrees sample was more aggressive than the 90 degrees sample, and produced a well oriented, and high density of scratches, although some waviness was also seen. SEM photographs taken of both samples after use showed that NiP chips were piled at the edges of the pattern tops on the 90 degrees sample, whereas chips were found over the entire surface of the 60 degrees sample. This observation suggested that the 60 degrees angle aided in the flow of the coolant used during texturing and the swarf was more efficiently removed from the disk/abrasive interface. For both samples, the abrasive surface contacted the disk uniformly. For Example 13, the scratch density was high and uniform for both the 90 degrees and 60 degrees samples, and no significant differences between the textured disks could be seen. Similar to Example 12, SEM photographs showed that NiP chips piled at the edges of the pattern tops of the 90 degrees sample and over the entire surface of the 60 degrees sample. Again, for both samples, the abrasive surface contacted the disk uniformly.

Example 14

An abrasive article of the method of this invention was used for texturing of a glass substrate. The Example was prepared according to the General Procedure for Making the Abrasive article, using 47.5 parts TMPTA, 47.5 parts TATHEIC, 1 part PH2, 100 parts DP, and 4 parts FS. The production tooling used had three sided pyramidal cavities, approximately 180 micrometers deep. The slurry was coated onto a 76 micrometer thick polyethylene teraphthalate film having a 20 micrometer thick prime layer of ethylene acrylic acid.

A glass rigid disk (with no metal alloy coating) was textured using the Texturing Procedure. The spindle speed was set to 400 rpm, the "hi force" was set to a force at contact 6.30 lbs, the "lo force" was set to a force at contact 5.70, and the test endpoint was 30 seconds. The surface finish results were (reported in Angstroms):

*Ra:* 21.5±0.6

*Rms:* 27.6±1.2

The results indicated that the method of the invention also provided acceptable surface finish results for texturing a nonmetal substrate, namely a glass substrate.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of texturing a rigid substrate of a magnetic recording medium before application of a magnetic coating to said substrate, said method comprising the steps of:
   a) providing a rigid substrate;
   b) providing an abrasive article in frictional contact with said substrate, said abrasive article comprising a flexible backing having a major surface with a total surface area and an abrasive coating, said abrasive coating attached to and at least substantially covering all said total surface area of said major surface, wherein said abrasive coating includes a plurality of precisely-shaped three-dimensional abrasive composites, said composites comprising a plurality of abrasive particles dispersed in a binder, which binder provides the means of attachment of said composites to said backing;
   c) abrading said substrate with said abrasive article to form scratches with an Ra of between about 10 angstroms to about 70 angstroms in said substrate, said scratches being sharply defined and producing an acceptable scratch density.

2. The method of claim 1, wherein said rigid substrate comprises a metal base having opposing major surfaces, a metal coating formed on at least one of said major surfaces.

3. The method of claim 1, wherein said rigid substrate comprises a glass material.

4. The method of claim 1, wherein said rigid substrate comprises a ceramic material.

5. The method of claim 1, wherein said abrasive particles are provided with an average size of 0.1 to 5 micrometers.

6. The method of claim 1, wherein said abrasive particles are provided with an average size of about 0.1 to 3 micrometers.

7. The method of claim 1, wherein said abrasive particles comprise aluminum oxide.

8. The method of claim 1, wherein said abrasive composite is provided with a weight ratio of said abrasive particles to said binder between about 8:1 to about 1:1.

9. The method of claim 1, wherein said rigid substrate is circular and further wherein said step of abrading further comprises rotating said rigid substrate about its center to form substantially circumferential scratches.

10. The method of claim 9, wherein said step of rotating further comprises moving said substrate at a speed of at least about 7.5 meters per minute at an interface between said metal coating and said abrasive article.

11. The method of claim 1, wherein said step of abrading further comprises forming substantially circumferential scratches with an Ra of between about 25 angstroms to about 55 angstroms.

12. The method of claim 1, wherein said abrasive article further comprises said backing having a machine direction axis and opposite side edges, each side edge being parallel to said machine direction axis and each side edge being respectively within a first and second imaginary plane each of which is perpendicular to said backing, wherein said abrasive composites comprise a plurality of parallel elongate abrasive ridges deployed in fixed position on said backing, each ridge having a longitudinal axis located at its transverse center and a distal end which is spaced from said surface, and a midpoint located on its outer surface defined by an imaginary line which is within a third imaginary plane which contains said longitudinal axis and is perpendicular to said backing, and wherein each said abrasive ridge extends along said imaginary line to intersect said first and second planes at an angle from about 30 degrees to about 60 degrees.

13. The method of claim 12, wherein said abrasive ridges each comprise a continuous line of upraised abrasive material.

14. The method of claim 12, wherein said abrasive ridges each comprise a protuberance extending continuously between said side edges.

15. The method of claim 14, wherein said abrasive ridges comprise adjacent ridges which abut at said backing.

16. The method of claim 14, wherein said protuberance is a pyrmaidal shape having an apex and sides, said sides intersecting at said apex to form an angle therebetween of from about 70 to about 110 degrees.

17. The method of claim 12, wherein said abrasive ridges each comprise a plurality of separate abrasive composites that are aligned with transverse centers located on said longitudinal axis or its imaginary line extension.

18. The method of claim 17, wherein each of said separate abrasive composites comprises a pyramidal shape having at least three sides.

19. The method of claim 18, wherein said pyramidal shape comprises a truncated pyramidal shape.

20. The method of claim 1, wherein said abrading is accomplished in a liquid environment.

21. The method of claim 1, wherein said step of abrading further comprises oscillating said abrasive article in a direction substantially perpendicular to a direction of travel of said rigid substrate during said abrading.

* * * * *